July 17, 1951  J. S. OROPEZA  2,561,131
ELECTRICALLY OPERATED POWER PLANT
Filed March 16, 1949  2 Sheets-Sheet 1
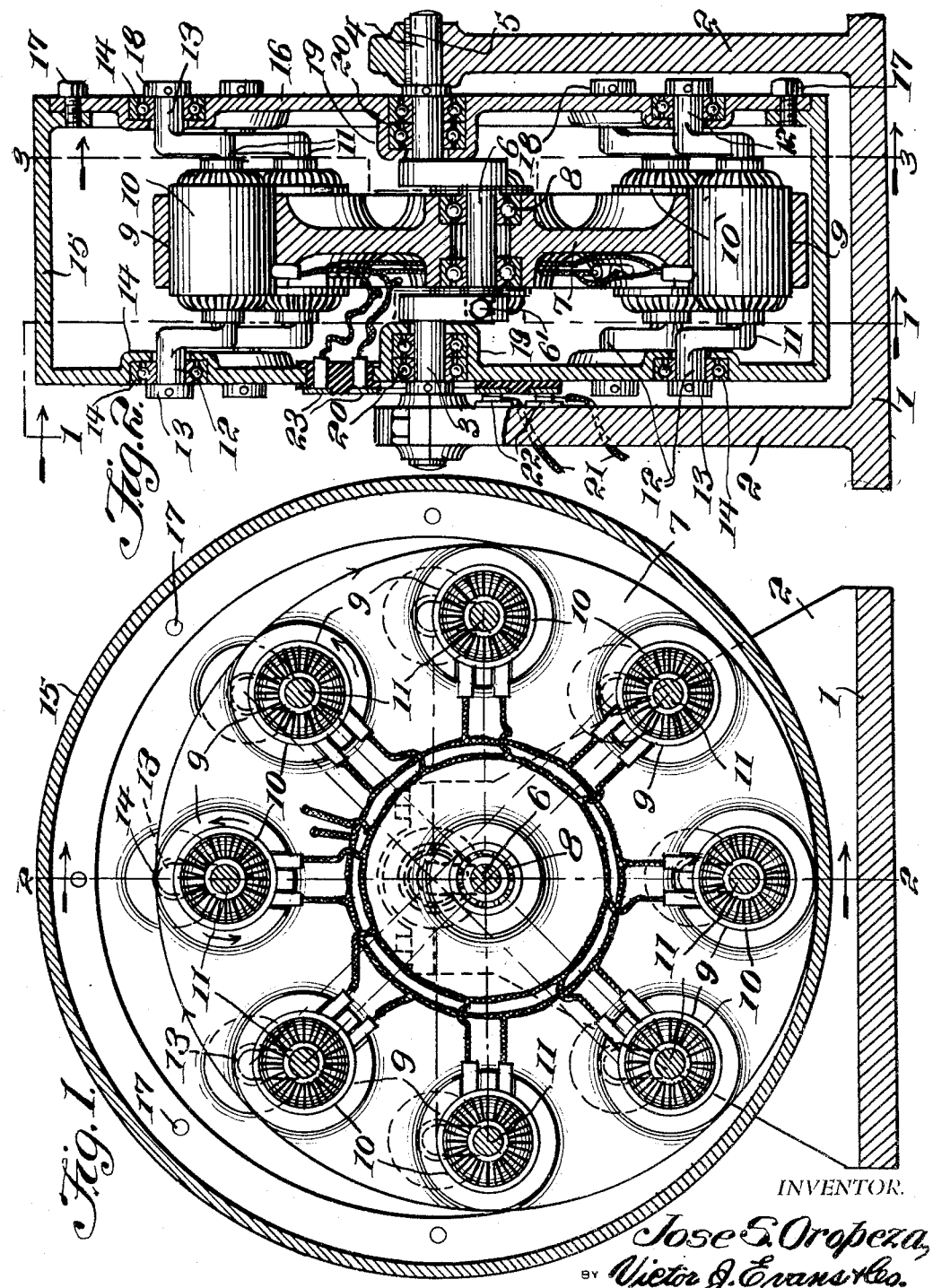
INVENTOR.
Jose S. Oropeza,
BY Victor J. Evans &Co.
ATTORNEYS

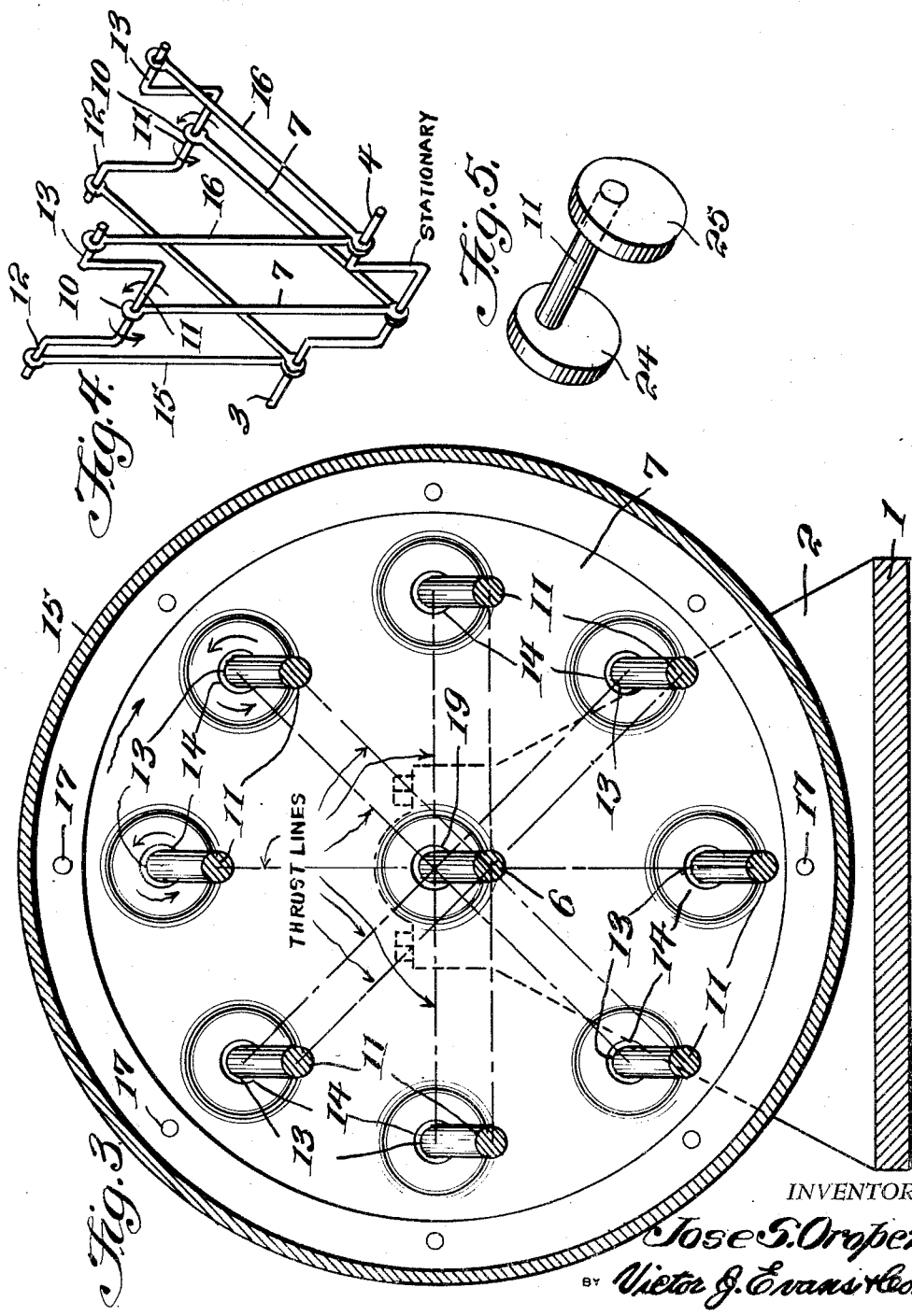

Patented July 17, 1951

2,561,131

UNITED STATES PATENT OFFICE 2,561,131

ELECTRICALLY OPERATED POWER PLANT

Jose S. Oropeza, Los Angeles, Calif.

Application March 16, 1949, Serial No. 81,645

1 Claim. (Cl. 172—36)

My present invention relates to power plants involving rotary to rotary mechanical movements for use in driving stationary industrial mechanisms and smaller household appliances, as well as for propelling various types of wheeled and other vehicles, and more specifically to an electrically operated power plant embodying a rotary impeller, an eccentrically mounted rotor-housing for the impeller, and electrically operated power transmitting means uniting these elements and synchronizing their movements. The power plant may be installed, and means may be provided for taking off power from the rotor-housing and transmitting the power and movement for activating various operating mechanisms, as well as for propulsion purposes.

In the electromechanical rotary torque transmitting power plant a minimum number of parts are included which may with facility be manufactured at low cost of production, and the parts may be assembled with convenience to assure a durable and reliable variable speed mechanism that may be installed with comparative ease for the performance of its required functions.

The invention consists in certain novel features of construction and combinations and arrangements of parts as will hereinafter be described and more particularly set forth in the appended claim. In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying drawings and mechanical as well as electrical structures, within the scope of my claim, without departing from the principles of the invention.

Figure 1 is a vertical sectional view of the power plant as at line 1—1 of Fig. 2; and Figure 2 is a transverse vertical sectional view at line 2—2 of Fig. 1.

Figure 3 is a vertical sectional view at line 3—3 of Fig. 2.

Figure 4 is a diagrammatic perspective view showing the transmission of power and motion from the impeller to the rotor-housing; and Figure 5 is a perspective view showing a modified form of cam or eccentric connection of the housing, and its driving means.

In the drawings I have illustrated a preferred form of the invention wherein the parts are evenly balanced for smooth operation in the transmission of power at variable speeds from an enclosed impeller to an enclosing rotor-housing, and the usual electrical controls are employed for selectively supplying electrical energy to the electrical equipment of the power plant, to attain variable speeds.

In carrying out my invention I may employ a main frame including a bed plate 1 and bearing posts or standards 2, for supporting a sectional crank axle preferably made up of axially alined sections 3 and 4 that are keyed at 5 or otherwise fastened in the bearing standards or posts; and these crank-sections of the axle are united by an intermediate journal 6, a set bolt 6' being employed to fasten together the assembled sections.

A rotary wheel or impeller 7 in the form of a circular disk is mounted by journal bearings 8 on the intermediate journal 6 of the crank axle before the sections are united, and the impeller is fashioned with an annular series of sockets 9 opening transversely through the body of the impeller. A suitable number of sockets, here shown as eight, may be utilized for supporting multiple electrical motors 10 of standard make, and the motors are provided with armature shafts 11, each of which shafts have oppositely projecting cranks or crank sections 12 and 13 rigid therewith.

The axially alined journals 12 and 13 of the armature crank shafts are journaled in bearings as 14 of a cylindrical rotor-housing 15 and its detachable head plate 16 which is bolted at 17 to the open end of the housing.

The rotor housing encloses the impeller, and the journals 12 and 13 project laterally through the housing and the head plate, with retaining heads 18 mounted on the journals exterior of the bearings 14.

The rotor housing, with its detachable end plate is journaled, by its hubs 19 and bearings 20 upon and concentric with the axially alined and spaced journal ends or sections 3 and 4 of the crank axle, and within the upright posts or standards 2, 2 of the frame. The impeller 7 by reason of the journal 6 of the crank axle is therefore eccentric to the main axis of the sections 3 and 4 of the crank axle.

Electrical energy, under suitable controls, is supplied to the multiple motors 10 through conductor wires 21 to stationary contacts 22 mounted on the frame posts 2, and co-acting conductor rings 23 mounted on the exterior of the rotor housing and encircling its journal bearing.

As the multiple motors are energized their armature crank shafts are revolved, and the eccentrically arranged motors and their shafts transmit power and motion to the enclosing housing, and power may be taken off the driven rotor-housing in suitable manner and transmitted for application to a desired driven mechanism.

In Fig. 5 a modified form of the eccentric driving mechanism is illustrated, in which the armature shaft 11 of each motor is equipped at its opposite ends with eccentric disks 24 and 25 that are mounted in the bearings 14 of the housing and its detachable head.

The distribution of power is illustrated in Figs. 3 and 4, and power may be taken off the exterior periphery of the rotor-housing by belt drive, or in other suitable manner.

Having thus fully described my invention, what I claim as new and desire to secure by Letters Patent is:

In an electrically operated power plant of the multiple motor type, the combination with a crank axle and its main axis, a rotary impeller and its fixed axle eccentric to the main axis of the crank axle, an annular series of motors mounted in the impeller, transversely arranged armature crank shafts for the motors, and axially aligned eccentric journal ends rigid with said shafts, of an enclosing rotor housing journalled on the crank axle concentric with the main axis of the crank axle, said rotor housing having spaced aligned bearings for the eccentric journal ends, the armature crank shafts being so formed that the throw of said armature crank shafts are equal to the throw of the crank axle, means for supplying electric energy to the motors and said rotor housing adapted to be engaged by a suitable belt to provide a power take off for the power plant.

JOSE S. OROPEZA.

REFERENCES CITED

The following references are of record in the file of this patent:

UNITED STATES PATENTS

| Number | Name | Date |
|---|---|---|
| 931,743 | Farrell | Aug. 24, 1909 |
| 1,172,456 | Hoadley | Feb. 22, 1916 |
| 2,394,296 | Farrell | Feb. 5, 1946 |